US006286139B1

(12) United States Patent
Decinque

(10) Patent No.: US 6,286,139 B1
(45) Date of Patent: Sep. 4, 2001

(54) INTERNET-BASED VIDEO ORDERING SYSTEM AND METHOD

(75) Inventor: Donald P. Decinque, Audubon, NJ (US)

(73) Assignee: Teluve Corporation, Mount Laurel, NJ (US)

( * ) Notice: Subject to any disclaimer, the term of this patent is extended or adjusted under 35 U.S.C. 154(b) by 0 days.

(21) Appl. No.: 09/129,488

(22) Filed: Aug. 4, 1998

(51) Int. Cl.[7] .................................................. G06F 17/60
(52) U.S. Cl. .......................... 725/5; 725/61; 725/122; 705/26; 705/27
(58) Field of Search ........................... 705/1, 26, 27, 705/41, 42, 43; 235/375, 376, 377, 378, 379, 380, 381, 382, 382.5; 395/200.3, 186, 187, 188; 725/5, 61, 122

(56) References Cited

U.S. PATENT DOCUMENTS

| 4,797,913 | | 1/1989 | Kaplan et al. ........................ 379/91 |
| 5,418,713 | * | 5/1995 | Allen ...................................... 705/32 |
| 5,483,278 | * | 1/1996 | Strubbe et al. ......................... 348/7 |
| 5,694,546 | | 12/1997 | Reisman .......................... 395/200.9 |
| 5,710,887 | | 1/1998 | Chelliah et al. ................... 395/226 |
| 5,734,823 | * | 3/1998 | Saigh et al. ......................... 709/229 |
| 5,737,414 | | 4/1998 | Walker et al. ........................ 380/4 |
| 5,878,141 | * | 3/1999 | Daly et al. ........................... 380/25 |
| 5,918,213 | * | 6/1999 | Bernard et al. ...................... 705/26 |
| 5,926,798 | * | 7/1999 | Carter ................................... 705/26 |
| 5,950,173 | * | 9/1999 | Perkowski ............................ 705/26 |
| 6,002,394 | * | 12/1999 | Schein et al. ....................... 345/327 |

* cited by examiner

*Primary Examiner*—Reba I. Elmore
(74) *Attorney, Agent, or Firm*—Dechert

(57) ABSTRACT

A system and method for ordering video content through the Internet. The system includes a customer interface accessible to a customer, at which the customer obtains information about video content and inputs order information using an interactive device. An Internet server in communication with the customer interface transmits input order information to a data processing center for processing. The data processing center communicates the processed order information to the vendor of the ordered video content, and receives from the vendor information regarding the status of the order, which it then transmits to the customer interface via the Internet server. In one embodiment of the system of the present information, the computer interface is updated with new video content information received from the vendor via the data processing center and the Internet server. The Internet server can be programmed with customer identification information for verification of customer identify. Preferably, information is communicated between the customer interface and the Internet server in real time.

21 Claims, 1 Drawing Sheet

INTERNET-BASED VIDEO ORDERING SYSTEM AND METHOD

The present invention relates to a system that permits a consumer to order video content from various vendors using Internet communication.

With the increasing use of the Internet by consumers, many vendors have established a presence on the Internet by creating a website. While much of the content of these websites consists of advertising material, the Internet offers great potential for transactional commerce. Because the Internet allows for two-way communication between a vendor and a customer, vendors not only can advertise products or services, but also can receive customers' orders on the Internet.

While there are systems known in the art for automated ordering of products or services, these systems rely on telephone communication. One common telephone-based system involves a customer placing a telephone call to an operator and ordering a product or service through voice communication. Another telephone-based system, which is disclosed in Pat. No. 4,797,913 issued to Kaplan et al., involves a customer placing a telephone call to an ordering service office and placing orders based on digit codes imbedded in the dialed number or subsequently entered by the consumer using the telephone, without the need for voice communication with an operator. These systems all require the customer to place a separate telephone call to communicate an order.

Vendors of video content often use telephone-based ordering systems to enable customers to subscribe for certain video content. Once ordered, the video content, for example, a movie, sporting event or premium cable channel is delivered via cable lines to the customer's television set, and the customer is billed for the order by his or her cable provider. A number of these vendors also have websites which advertise video content services. For example, a website of a pay per view television services vendor may display extensive program descriptions, features about celebrities, program reviews and program previews. The ordering system of the present invention permits a website to act as a customer interface to allow a customer to interact directly with a website display to order video content. By not requiring the customer to place a separate telephone call, the ordering system of the present invention provides for greater spontaneity without losing the impulse purchase potential presented by the website display. The ordering system of the present invention can operate simultaneously with a telephone-based ordering system, using much of the same infrastructure. Thus, both Internet-based and telephone-based orders can arrive at the vendor using the same interface, without the need for additional hardware or software at the vendor's location.

SUMMARY OF THE INVENTION

The invention provides a system for ordering video content using the Internet comprising an interactive device for transmitting order information between a customer and an Internet server, a customer interface for facilitating the transmittal of information between the customer and an Internet server; an Internet server for transmitting order information between the interactive device and a data processing center, a data processing center for processing order information, and a video content provider for delivery of video content to the customer.

In a preferred embodiment of the invention, the data processing center transmits the order information to the vendor, and receives from the vendor order status information. Still more preferably, the information provided by the customer interface is updated by new product or service information transmitted by the vendor to the data processing center, by the data processing center to the Internet server, and by the Internet server to the customer interface.

In another preferred embodiment, the Internet server comprises customer identification information for verification of customer identity. Preferably, the customer identification information is a telephone number and multiple-digit passcode.

In another preferred embodiment, the information transmitted between the customer interface and the Internet server is transmitted in real time.

The invention also provides a method of ordering video content by a customer using the Internet which comprises displaying product or service information at a customer interface accessible to the customer by an interactive device, transmitting order information input by the customer from the customer interface to an Internet server, transmitting the order information from the Internet server to a data processing center for receiving the order information from the Internet server, processing that information and transferring to the Internet server information regarding the status of the order; and transmitting to the customer interface the information received by the Internet server from the data processing center.

In a preferred embodiment of the invention, the method further comprises the steps of transmitting the order information from the data processing means to a video content vendor, and transmitting from the vendor to the data processing center order status information. Still more preferably, the method further comprises the step of updating the customer interface to contain new product or service information which is transmitted from the vendor to the data processing center, which in turn transmits the new information to the Internet server, which then transmits the new information to the customer interface.

In another preferred embodiment, the method further comprises the step of programming the Internet server to verify the identity of the customer. Still more preferably, the Internet server is programmed to compare customer telephone number and passcode data contained in a database with telephone number and passcode data input by a customer using the customer interface, and transmitted from the customer interface to the Internet server.

In yet another preferred embodiment, the information transmitted between the customer interface and the Internet server travels in real time.

DEFINITIONS

The following definitions shall be employed herein:

Internet: An publicly accessible international network of computers, linked by high speed data links, which permits the transmission of data from any computer linked to the network to any other computer linked to the network.

Website: Information contained in a file or group of files stored on one or more computers linnked to the Internet, designated by a Uniform Resource Locator and reached through a hypertext transfer protocol. The information can be in any form, for example, text, sound, video, or graphics, or any combination thereof.

Internet server: A computer directly linked to the Internet.

Data processing center: A device, such as a computer, which receives data from one or more input links, processes or stores the data, and outputs data through one or more output links.

Interactive device: A device, such as a computer, permitting a user to input information which is storable and transmissible in electronic form.

Order status information: Information regarding the acceptance or non-acceptance of an order.

Order form: A graphical display visible on an interactive device which prompts for, and accepts, order information.

Video content: Information which includes visual information. Visual information can be in any form, for example, analog or digital form.

Vendor: A provider, manufacturer, reseller, or distributer of video content.

BRIEF DESCRIPTION OF THE DRAWING

The foregoing summary, as well as the following detailed description of preferred embodiments of the invention, will be better understood when read in conjunction with the appended drawing. It should be understood, however, that the invention is not limited to the precise arrangements and instrumentalities shown. In the drawing.

DETAILED DESCRIPTION

Figure 1:
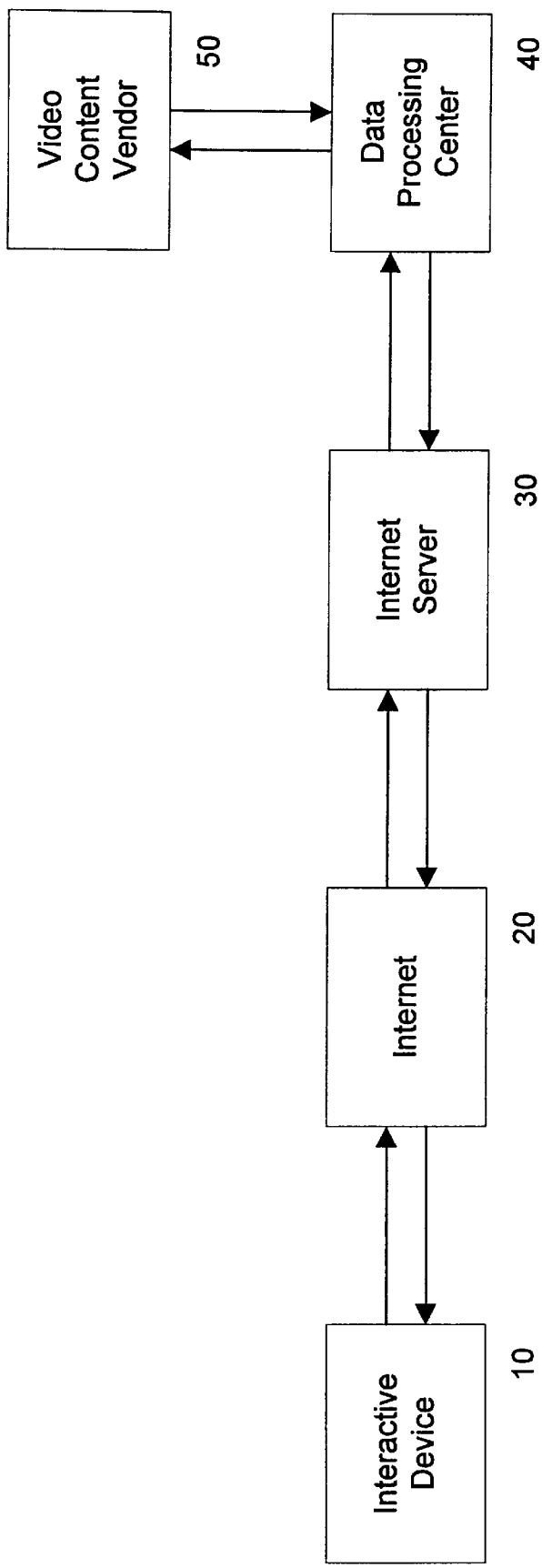
FIG. 1 is a block diagram representation of the components of an embodiment of the ordering system of the present invention.

Referring to the drawing, there is shown in FIG. 1 a block diagram representation of the components of the ordering system of the present invention. In operation, an ordering customer uses an interactive device 10, to connect to the Internet 20, which contains a website displaying information regarding products and services related to video content. In one preferred embodiment, the interactive device is a personal computer, which connects to the Internet via telephone lines. In another preferred embodiment, the interactive device is a handheld computer, which connects to the Internet via cellular telephone technology. In yet another preferred embodiment, the interactive device is television set which connects to the Internet via cable lines.

The customer enters order information on the interactive device 10, which is displayed on the website display. The order information can be entered by the customer in a variety of ways, including typing in the necessary information, using a pointing device, such as a mouse or a wand, or touching a screen display, or doing some combination. An order form may be initially displayed, or may be displayed in response to input from the customer. For example, to order a pay television program, the customer could type into a displayed order form a number representing the desired program, the customer's account number, and a password to verify the identity of the customer. In a preferred embodiment, the number representing the desired program is identical to an 800 telephone number which can also be used to order the program via conventional telephone means and the customer's account number is the customer's home telephone number. Alternatively, the customer could click on a program name or an icon representing the desired program to indicate the desired program.

An Internet server 30 receives the order information and communicates that information to a data processing center 40 (for example, an HP9000 computer manufactured by Hewlett Packard). In one embodiment, the Internet server and data processing center are in one computer. In another embodiment, the Internet server and data processing center are separate computers or portions of computers, and are connected with an data link. In a preferred embodiment, the data link is an internal link.

The data processing center 40 processes the order information and communicates that information to the video content vendor 50, which in turn communicates a response to the order back to the data processing center 40. In a preferred embodiment, the center 40 communicates the information to the vendor 50, and the vendor 50 communicates a response back to the data processing center 40 in the same manner as with a telephone-based order, as disclosed in the Kaplan patent referred to above. The data processing center 40 then transmits the response back to the Internet server 30. The Internet server 30 then communicates this response back to the customer's interactive device 10 in the form of a display on the website, as viewed on the customer's interactive device. In a preferred embodiment, the response includes an indication whether the order has been accepted, and if accepted, information what video content will be delivered to the customer and when it will be delivered.

In a preferred embodiment of the ordering system of the present invention, the Internet server 30 is programmed with HTML and CGI software to display order form information to a customer on a website. This order form information could be generated by an Internet server 30 operated by the vendor 50 (for example, a cable television company) or by an Internet server 30 operated by a third party, such as a provider of ordering services or, in the case of pay television products or services, for example, a movie studio, event promoter or television program listing service. Furthermore, in a preferred embodiment of the ordering system of the present invention, information travels between the customer's interactive device 10 and the Internet server 30 in real time. For example, the information could travel using the TCP/IP Internet transmission method that is known to those skilled in the art.

In a preferred embodiment of the ordering system of the present invention, the product and service information displayed on a website is updated with more current information. Preferably, the information is updated daily, still more preferably, hourly, and still more preferably about every ten (10) minutes. The data processing center 40 is programmed with the updated information, and in turn, communicates this information to the Internet server 30, which in turn updates the website information displayed on the customer's interactive device 10. In a preferred embodiment, the more current information is transmitted by the vendor 50 to the data processing center 40.

In a preferred embodiment of the ordering system of the present invention, the system contains a customer verification feature designed to protect a customer from incorrectly receiving products or services ordered by another party (for example, where the other party purposefully poses as the customer or inadvertently enters incorrect order information). To implement this feature, the Internet server 30 comprises a database including data identified to a particular customer, for example, multiple-digit passcode information or telephone number data. In a further preferred embodiment, this customer identification information is initially conveyed to the Internet server 30 using secure or protected means. For example, a customer places a telephone call and enters a multiple-digit passcode, which is stored in the database of the Internet server 30, together with the customer's telephone number data which is automatically transmitted to the database when the customer makes the telephone call, using means known to one skilled in the art.

In another preferred embodiment, the customer registers on the website by providing passcode selected by the customer and/or telephone number data by entering such information on the customer's intereactive device 10, which transmits the information to the Internet server in an encrypted form, or via a secure data link. When ordering a product or service on using the Internet 20, the customer enters his or her telephone number and passcode data on the website display using his or her interactive device 10 for transmission over the Internet 20 to the Internet server 30. The Internet server 30 then compares this paired telephone number and passcode data with the data contained in its database to verify the identify of the customer. If the paired data transmitted from the customer to the Internet server 30 does not match the data contained in the database of the Internet server 30, the Internet server 30 transmits to the website display a message that the order is rejected. To discourage persons from using automated programs designed to determine telephone number and passcode data for other customers, the Internet server 30 can be programmed to limit the number of times a person could enter incorrect customer telephone number and passcode data within a specified time interval. In yet another preferred embodiment, the customer identification information could be stored in a database in the data processing center 40 or at the video content vendor 50 and used as described above to verify orders, as is known to one skilled in the art.

In another preferred embodiment, the video content ordered is delivered to the customer via cable lines to the customer's television set, and the customer is billed for the video content by the video content provider. Still more preferably, the video content provider is the customer's cable services provider.

In another preferred embodiment, the customer uses the interactive device 10 to access a website on the Internet 20, which displays information regarding premium cable channels. In response to information input by the customer, by example, using a pointing device to click on an image, the customer is provided with a display listing cable television systems. The customer selects the customer's sytem or inputs information regarding his or her cable provider. The website then displays an order form specific to the customer's system, which may be already partially filled out, or "hardcoded" with information regarding the system. The customer provides additional requested information specific to the customer using the interactive device 10, and the order information is transmitted to the Internet server 30. In a preferred embodiment, the customer provides a home telephone number (ANI). The Internet server stores the order information and compares it to information in its database, and sends processed order information to the data processing center 40 which processes the order as described above.

While this invention has been described with an emphasis upon preferred embodiments, it will be obvious to those of ordinary skills in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A system for a customer ordering video content using the Internet, the system comprising an interactive device, a telephone registration transmitting device, a customer interface, an Internet server, a data processing center, and a video content provider, wherein a) the telephone registration transmitting device is a telephone that transmits customer identification information, wherein the customer identification information comprises telephone address information and a first passcode, wherein the telephone address information comprises a first telephone number of the telephone registration device, wherein the first passcode is entered by the customer using the telephone registration transmitting device and wherein the customer identification information can be accessed by the Internet server;

b) the interactive device transmits order information and customer verification information between the customer and the Internet server;

c) the customer interface facilitates the transmittal of the order information and customer verification information between the interactive device and the Internet server, wherein the customer verification information comprises a second telephone number and a second passcode, wherein both the second telephone number and the second passcode are entered by the customer using the interactive device;

d) the Internet server accesses the customer identification information and customer verification information and compares the first telephone number and the second telephone number, the Internet server also compares the first passcode with the second passcode, the Internet server transmits the order information between the interactive device and the data processing center only if the first telephone number matches the second telephone number and the first passcode matches the second passcode;

e) upon receiving order information from the Internet server, the data processing center processes order information; and f) the video content provider delivers video content to the customer using broadband signals in response to order information received from the data processing center.

2. The system of claim 1, wherein the data processing center transmits the order information to the vendor and receives from the vendor order status information.

3. The system of claim 1, wherein the customer interface is updated to contain new product or service information which is transmitted from the vendor to the data processing center, which in turn transmits the new information to the Internet server, which then transmits the new information to the customer interface.

4. The system of claim 1, wherein the customer identification information comprises a passcode for each customer.

5. The system of claim 1, wherein the order information and customer verification information is transmitted between the customer interface and the Internet server in real time.

6. The system of claim 1, wherein the broadband signals are transmitted by cable lines.

7. The system of claim 1, further comprising a customer registration database, wherein customer identification information is stored in the customer registration database and wherein the Internet server accesses the customer registration database.

8. The system of claim 1, wherein: (i) the system further comprises an automated telephone address information source, (ii) the automated telephone address information source provides telephone address information of the telephone registration transmitting device.

9. The system of claim 7, wherein: (i) the system further comprises an automated telephone address information source, (ii) the automated telephone address information source provides telephone address information of the telephone registration transmitting device and (iii) the telephone address information is stored in the customer registration database.

10. The system of claim 7, wherein the Internet server further (i) compares the customer verification information to the customer identification information and telephone address information stored in the customer registration database and (ii) transmits the order information only if the customer verification information matches the appropriate customer identification information and corresponding telephone address information stored in the computer registration database.

11. The system of claim 1, wherein the data processing center locates the appropriate video content provider.

12. The system of claim 1, wherein the data processing center transmits the order information to the vendor using a telephone-based order method.

13. A method for ordering video content for delivery using broadband signals by a customer using the Internet, comprising the steps of:
   a) displaying product or service information at a customer interface accessible to the customer by an interactive device;
   b) registering a customer using a telephone registration transmitting device, wherein registration comprises entering customer identification information using the telephone registration transmitting device, wherein the customer identification information comprises telephone address information and a first passcode, wherein the telephone address information comprises a first telephone number of the telephone registration device, wherein the first passcode is entered by the customer using the telephone registration transmitting device;
   c) transmitting customer verification information and order information input by the customer from the customer interface to an Internet server, wherein the customer verification information comprises a second telephone number and a second passcode;
   d) comparing the first telephone number and the second telephone number, and comparing the first passcode with the second passcode;
   e) transmitting the order information submitted by a registered customer from the Internet server to a data processing center for receiving the order information from the Internet server only if the first telephone number matches the second telephone number and the first passcode matches the second passcode, wherein a registered customer is a customer who has registered according to step b) above,
   f) delivering the video content to the customer using broadband signals in response to order information received from the data processing center.

14. The method of claim 13, comprising transferring to the Internet server information regarding the status of the order, and transmitting to the customer interface the information regarding the status of the order.

15. The method of claim 13, further comprising updating the customer interface to contain new product or service information which is transmitted from the vendor to the data processing center, which in turn transmits the new information to the Internet server, which then transmits the new information to the customer interface.

16. The method of claim 13, wherein the wherein the order information and customer verification information transmitted between the customer interface and the Internet server travels in real time.

17. The method of claim 13, wherein the broadband signals are transmitted by cable lines.

18. The method of claim 13, further comprising identifying telephone address information of the telephone registration transmitting device using an automated telephone address information source.

19. The method of claim 13, further comprising storing the customer identification information with the telephone address information in a customer registration database.

20. The method of claim 19, further comprising (i) transmitting customer verification information input by the customer using the customer interface and (ii) verifying that the customer verification information matches the customer identification information and telephone address information stored in the customer registration database.

21. The method of claim 19, wherein order information is transmitted to an appropriate video content provider of the customer when the customer verification information matches the customer identification information and telephone address information stored in the customer registration database.

* * * * *